United States Patent Office 3,442,549
Patented May 6, 1969

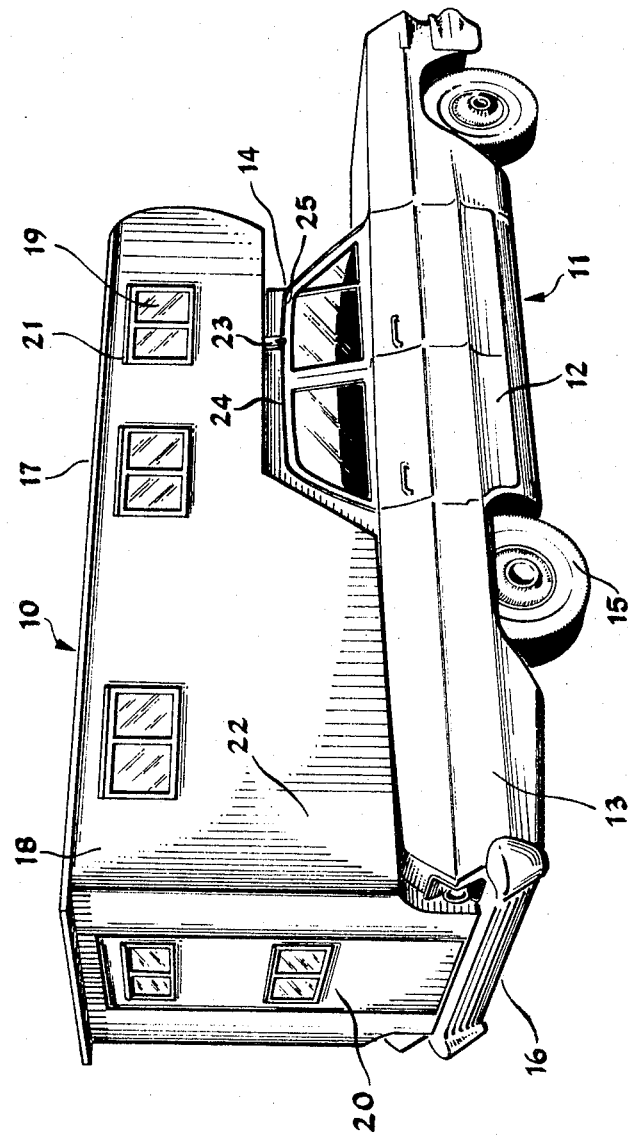

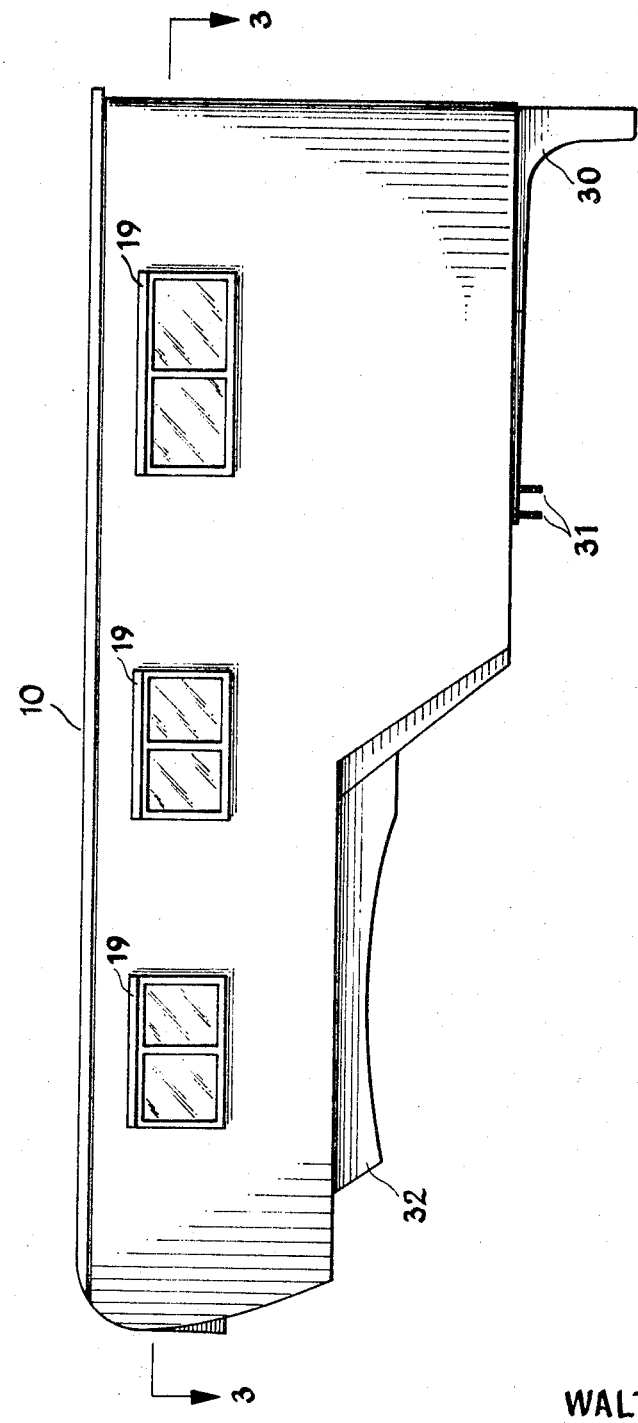

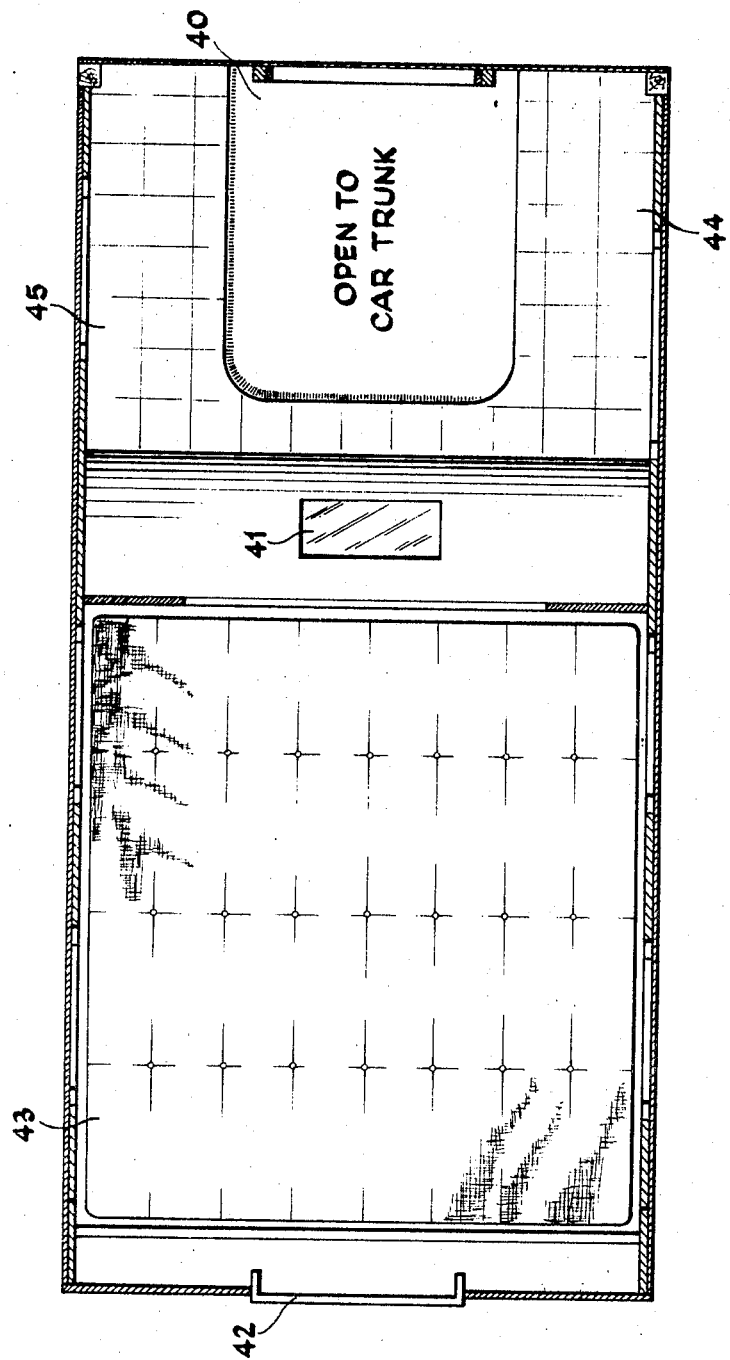

3,442,549
CAMPER
Walter J. Granger, 1110 Northview Drive,
Cocoa, Fla. 32922
Filed Aug. 22, 1966, Ser. No. 573,914
Int. Cl. B60p 3/32
U.S. Cl. 296—23       5 Claims

ABSTRACT OF THE DISCLOSURE

A car camper apparatus and method for placing a camper body upon a sedan type automobile, whereby the trunk lid is removed from the automobile and the camper body secured superimposed thereupon. The forward section of the camper body extends over the roof of the automobile passenger compartment and the rear section covers the luggage compartment so that the floor of the luggage compartment may be used as a floor for the camper. The camper has a rear door and may have a double bed, bunks, storage and cooking facilities, and the like.

---

The present invention relates to campers and more particularly to campers of the type that fit upon automobile sedans.

In the past, several types of campers have been available. Trailer campers with wheels which are pulled by various types of vehicles have been widely used and may have beds, storage space and cooking facilities such as stoves and ice boxes. Trailer campers, however, have several disadvantages from many campers in that they are expensive to build and inconvenient to hook up to the towing vehicle and then to unhook as required. They require slower speeds over highways since they are classed as towed vehicles and are bulky to maneuver.

Another well-known type of camper is called a pickup camper, since the camper body is placed upon a pickup truck. These campers are available in many variations which range from simple shells for basic shelter to a complete living vehicle with heat, light, gas cooking and refrigeration, air conditioning and toilet facilities. The major disadvantage of this type of camper is that an expensive pickup truck must be bought specifically for hauling the camper and will normally never be burdened with other hauling chores.

Compact bus type campers have also been used where a panel type truck or bus is converted into a camping travel wagon. These small trucks are compact and may include all the camping facilities such as bunks, and cooking facilities. They are also very expensive, since it requires purchasing a vehicle just for use as a camper.

Finally, it has been suggested to place campers upon station wagons and sedan automobiles. This has the advantage of being compact and low in cost since presently owned vehicles may be utilized. In the past, these campers have accomplished their purpose in an unsuitable manner. This is particularly true with campers for sedan type automobiles where the campers have simply been placed atop the car in various ways but frequently in a manner not to leave convenient access to the luggage compartment or trunk of the automobile. These campers also usually do not have standing room for dressing and cooking and are difficult to enter and exit.

In contrast to these prior art campers utilizing sedan type automobiles, the present invention provides a more compact unit when placed upon the vehicle while allowing a person to stand up inside the camper and allows an easy and convenient egress and ingress.

The present invention combines a sedan type automobile in which the lid to the luggage compartment has been removed and the camper body has been superimposed thereupon. The camper body has a forward section which extends over the roof of the automobile passenger compartment and a rear section which covers the luggage compartment. The rear section of the camper body advantageously has a partially open bottom so that the floor of the luggage compartment may be used as a floor for the camper. A door is located in the rear of the camper for entry into and out of the camper and upon entering the rear door, one may stand on the luggage compartment floor of the automobile. A double bed may be provided in the forward portion over the roof of the automobile, and bunks, storage and cooking facilities, or the like, may be provided on either side of the standing area or luggage compartment.

The novel features that are considered characteristic of this invention are set forth with particularity in the appended claims. The invention itself, both as to its organization and method of appending to an automobile, will best be understood from the following description when read in connection with the accompanying drawings, in which:

FIGURE 1 is a perspective view of the present camper attached to a sedan automobile;

FIGURE 2 is a side view of the present camper removed from its accompanying automobile; and FIGURE 3 is a top cutaway view taken along the lines 3—3 of FIGURE 2.

Turning now to FIGURE 1, the present camper 10 is shown in combination with a sedan type automobile 11. A four-door sedan is shown but, as is obvious, a two-door sedan may also be used. The automobile has doors 12, rear fenders 13, roof 14 and rides on four wheels 15. A rear bumper 16 is connected to the frame of the automobile 11. The camper 10 has a roof 17, sides 18, windows 19 and a rear door 20. The camper body is preferably made of plywood covered with aluminum sheets, but may also be made with an all aluminum body or with other sheet metals, and has a forward section 21 which extends over the roof 14 of the automobile 11. A rear section 22 is placed directly over the luggage compartment of the car. The front section 21 is saddled onto the roof 14 by two contoured braces 24 which are fitted into the rain channels 25 of the automobile 11. This section is fastened down with straps 23, preferably made of stainless steel, which are hooked under the rain channels 25. The rear section 22 is fastened directly over the luggage compartment which has had the lid thereto removed. The rear portion 22 thus may be bolted into the same holes which formerly held the trunk lid. The camper 10 is also fastened to the rear frame of the automobile 11 near the bumper 16 or may be attached directly to bumper 16. The camper is made to fit snugly onto the automobile, especially around the luggage compartment area by contoured plates shaped for the particular automobile model. The camper preferably closes over the luggage compartment similarly to the surrounding edge of the trunk lid which has been removed.

Placing my camper on an automobile as described allows one to enter the rear door 20 easily without the help of a ladder or special entry device and upon entering the door 20 one may stand on the floor of the auto luggage compartment. To one side of the luggage compartment, which now forms part of the camper, may be located both over and under the top of fender 13, storage space, a camping stove, ice box, and the like. On the other side may be located a pair of bunks, one over the other, but both above the top of fender 13 with storage space under the top of the fender. The forward portion 21 of the camper would normally contain a double or full sized bed, or the like, and a device such as a step or a small ladder may be used to assist entry onto the double bed. In many automobiles the rear seat may also be removed to allow an opening into the seating compartment of the automobile. Thus, additional sleeping space may be provided by putting a second double bed or the like, extending from the luggage compartment of the camper into the rear seat area of the seating compartment of automobile 11. Visibility into the automobile from the camper may be provided by a window located near the rear window of the automobile and a similar window may be placed in the rear door of the camper so that visibility can be maintained from the automobile to the rear of the camper.

Turning now to FIGURE 2, there is shown a side view of the camper 10 of my invention with windows 19 located thereon. The section 30 is made to fit snugly upon the trunk or luggage compartment of the vehicle in place of the trunk lid which has been removed. The bolts 31 advantageously fit into the holes left from removing the trunk lid or may also fit into holes drilled into the body of the vehicle to which it is attached. The camper may also be fastened to the frame of the vehicle at the bottom of section 30.

Section 32 fits into the rain channels of the vehicle to brace the camper on the vehicle roof. This forward section 32 is strapped down to the rain channels with stainless steel clamps or the like. While the body of the camper is preferably made of plywood, covered with aluminum sheets, the windows 19 may have aluminum frames with glass panes. All cracks and joints are sealed with a fiber glass composition or other caulking compound and with aluminum molding to prevent air or rain leakage.

The contour plates including sections 30 and 32 are made to fit a particular make and model of a sedan automobile and by interchanging these contour plates, the same camper can be made to fit different automobiles. This flexibility in being able to adapt the same camper body for different types of automobiles advantageously allows one camper body to be produced in a more expedient manner and then fitted to the car of the purchaser. This feature also allows the owner to change automobiles without great expense in adapting the camper body to the new automobile.

FIGURE 3 is a cutaway top view taken along lines 3—3 of FIGURE 2 and shows the layout of the interior of the camper. The car trunk is located at 40 and forms part of the camper. The camper opens from the trunk area directly to the outside by way of door 20 at the rear of the camper. As can be seen in this view, a window 41 permits viewing inside the automobile from the camper and from the automobile through the camper body via a rear window which may be located in the rear door 20. A front window 42 is shown which allows a front view from within the camper and a better circulation of air within the camper body. The forward section with a double mattress is indicated at 43 and double bunks may be located at 44. A stove, refrigerator and storage area are located at 45.

From the foregoing description it will be clear that a camper has been provided for placement upon a sedan type automobile. The camper as described has a wide range of applications in addition to camping, such as hauling operations where the hauled material needs to be protected from the weather. It is to be understood that other variations are contemplated as being within the spirit of the invention. For instance, the means of attaching the camper to the automobile may be varied in accordance with different makes of automobiles and the shape of the camper body may be varied.

This invention is not to be construed as limited to the particular forms disclosed herein, since these are to be regarded as illustrative, rather than restrictive.

I claim:
1. A sedan type automobile with camper attached thereto, comprising in combination:
 (a) a sedan type automobile including a luggage compartment located in the rear of said automobile;
 (b) said luggage compartment having the lid removed therefrom;
 (c) a camper body superimposed upon said automobile, said camper body having a forward section overlaying the roof of said automobile, and a rear section located over said luggage compartment; and
 (d) attachment means attaching said camper body to said automobile, said attachment means including bolts fastened to said camper body, said bolts being secured to said automobile through bolt holes vacated by the removal of said luggage compartment lid, whereby said luggage compartment forms an integral part of said camper.

2. The camper according to claim 1, in which said camper body has contoured plates attached thereto for adapting said body to fit a particular automobile model.

3. The camper according to claim 2, in which said camper body includes contour bracing means bracing said camper body against rain channels on said automobile.

4. The camper according to claim 3, in which the floor of said camper is the luggage compartment floor.

5. The camper according to claim 4 but including a door located in said rear section of said camper body.

References Cited

UNITED STATES PATENTS

| | | | |
|---|---|---|---|
| 2,645,518 | 7/1953 | Cook | 296—23 |
| 2,614,882 | 10/1952 | Cook | 296—23 |
| 3,185,518 | 5/1965 | Zentner | 296—23 |
| D. 192,795 | 5/1962 | Sloat | 296—23 |
| 2,531,678 | 11/1950 | Gledhill | 296—23 |
| 2,246,813 | 6/1941 | Preston | 296—26 |
| 3,326,594 | 6/1967 | Van Atta | 296—23 |
| 3,290,084 | 12/1966 | McPherson | 296—23 |

PHILIP GOODMAN, *Primary Examiner.*